(12) United States Patent
Fu et al.

(10) Patent No.: US 10,198,829 B2
(45) Date of Patent: Feb. 5, 2019

(54) SYSTEMS AND METHODS FOR EXTRINSIC CALIBRATION OF A PLURALITY OF SENSORS

(71) Applicant: SYMBOL TECHNOLOGIES, LLC, Lincolnshire, IL (US)

(72) Inventors: Bo Fu, Wheeling, IL (US); Yan Zhang, Buffalo Grove, IL (US); Ye Gu, Rockville, MD (US); Jay J. Williams, Glenview, IL (US); Kevin J. O'Connell, Palatine, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/496,970

(22) Filed: Apr. 25, 2017

(65) Prior Publication Data

US 2018/0308254 A1 Oct. 25, 2018

(51) Int. Cl.

| | |
|---|---|
| *G06K 9/00* | (2006.01) |
| *G06T 7/80* | (2017.01) |
| *G06T 19/20* | (2011.01) |
| *G06T 7/33* | (2017.01) |
| *G06T 3/00* | (2006.01) |
| *G06T 7/66* | (2017.01) |
| *G06T 7/285* | (2017.01) |

(Continued)

(52) U.S. Cl.
CPC ............. *G06T 7/85* (2017.01); *G06K 9/6202* (2013.01); *G06T 3/0062* (2013.01); *G06T 7/285* (2017.01); *G06T 7/344* (2017.01); *G06T 7/66* (2017.01); *G06T 7/90* (2017.01); *G06T 19/20* (2013.01); *G06T 2207/10024* (2013.01); *G06T 2207/10028* (2013.01); *G06T 2207/20221* (2013.01)

(58) Field of Classification Search
CPC ........... G06T 7/85; G06T 7/285; G06T 7/344; G06T 7/66; G06T 7/90; G06T 3/0062; G06T 19/20; G06K 9/6202
See application file for complete search history.

(56) References Cited

U.S. PATENT DOCUMENTS 9,734,419 B1 * 8/2017 Ye .............................. G06T 7/00
2017/0064290 A1 * 3/2017 Beardsley ............ H04N 5/2252

OTHER PUBLICATIONS

Herrera et al., "Joint Depth and Color Camera Calibration with Distortion Correction", IEEE Transactions on Pattern Analysis and Machine Intelligence, vol. 34, No. 10, pp. 2058-2064 (Oct. 2012).

(Continued)

*Primary Examiner* — Phuoc Tran

(57) ABSTRACT

Image processing systems and methods are provided for extrinsic calibration of a plurality of image sensors. A logic circuit receives image data for an omnidirectional object from image sensors spaced apart and imaging at least a portion of a region of interest. The logic circuit combines the image data from the image sensors to generate a calibration matrix for the image sensors and to determine a matrix transformation data based on (i) reference image data and (ii) a three-dimensional model of the reference object. The logic circuit modifies the calibration matrix into an enhanced calibration matrix by applying the matrix transformation data to the calibration matrix, where the enhanced calibration matrix can be used to calibrate the plurality of image sensors.

24 Claims, 10 Drawing Sheets
(3 of 10 Drawing Sheet(s) Filed in Color)

(51) Int. Cl.
  *G06T 7/90* (2017.01)
  *G06K 9/62* (2006.01)

(56) References Cited

OTHER PUBLICATIONS

Carrera et al., "SLAM-Based Automatic Extrinsic Calibration of a Multi-Camera Rig", Imperial College London, Department of Computing. [retrived on May 4, 2017 @ https://www.doc.ic.ac.uld~ajd/Publications/carrera_etal_icra2011.pdf].
Herrera et al., "Accurate and Practical Calibration of a Depth and Color Camera Pair", University of Oulu, Machine Vision Group. [retrieved on May 4, 2017 @ https://pdfs.semanticscholar.org/bb9b/1fda005a7d10b15898cae280050a15a9694d.pdf].
Mang et al., "Camera Calibration from Images of Spheres", IEEE Transactions on Pattern Analysis and Machine Intelligence, vol. 29, No. 3, pp. 499-503 (Mar. 2007).
Shen et al., "Extrinsic Calibration for Wide-Baseline RGB-D Camera Network", IEEE International Workshop on Multimedia Signal Processing (Sep. 30-Oct. 2, 2013).
Puwein, J., et al., "Robust multi-view camera calibration for wide-baseline camera networks," in IEEE Workshop on Applications of Computer Vision (WACV), Jan. 2011.
Datta, A., et al., "Accurate camera calibration using iterative refinement of control points," in Computer Vision Vorkshops (ICCV Workshops), 2009.

* cited by examiner

FIG. 9A INITIAL SPHERICAL CALIBRATION ALIGNMENT ERROR: 0.12

FIG. 9B AFTER REFINEMENT ALIGNMENT ERROR: 0.007

FIG. 9C TRAJECTORIES OF SPHERICAL CENTERS FROM 4 CAMERAS WITH NOTICEABLE MISALIGNMENTS

FIG. 9D BETTER ALIGN TRAJECTORIES OF SPHERICAL CENTERS

SYSTEMS AND METHODS FOR EXTRINSIC CALIBRATION OF A PLURALITY OF SENSORS

FIELD OF THE DISCLOSURE

This disclosure relates generally to image processing systems and methods, and, more particularly, to systems and methods for the extrinsic calibration of a plurality of sensors based on image data captured from each of the plurality of sensors.

BACKGROUND

Sensors, such as cameras, depth sensors or infrared sensors, may be used to identify, track, or otherwise define an object moving in a space or region, such as a three-dimensional (3D) space or region. When using multiple sensors to track or define an object moving in a space or region, a problem may arise in calibrating the sensors to accurately identify, track, or define the moving object. For example, to acquire complete 3D image data for a large object with multiple sensors, the multiple sensors are typically placed far apart from each other, and with wide baselines in between. Such a layout can create challenges with respect to camera calibration due to varying or limited overlaps between the multiple sensor or camera views.

A conventional method used to calibrate multiple sensors can include a pairwise sensor calibration that involves aligning each sensor or camera one by one with respect to every other sensor. Such a process typically involves many permutations of pairwise calibration between each of the sets of sensors, and, as result is often time consuming and incurs high setup and maintenance costs. For example, the multiple sensors are typically installed at different locations and capture image data at varying angles, distances, and positions, all of which can make calibration of the multiple sensors, and the image data they capture, difficult, time consuming, and/or altogether inefficient when used for the purpose of identifying, tracking, or otherwise defining an object moving in a space or region.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
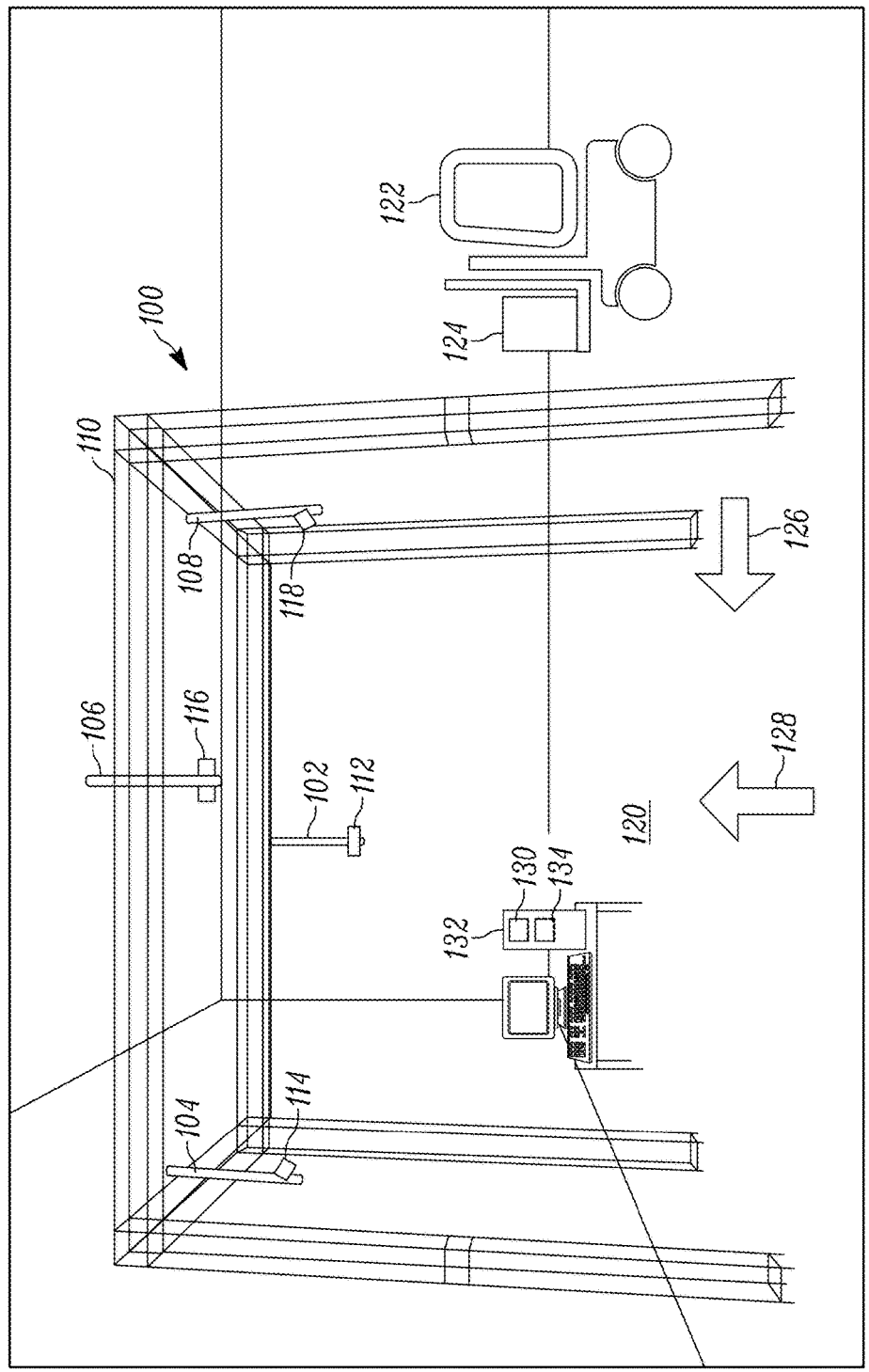
FIG. 1 depicts an example environment including a plurality of image sensors for capturing image data in accordance with teachings of this disclosure.

Example systems and methods disclosed herein provide efficient and accurate calibration of multiple image sensors, such as multiple cameras, depth sensors, and/or infrared sensors, by using image data captured from the image sensors (e.g., wide baseline cameras). Such calibration of multiple image sensors is useful when, for example, tracking objects moving through a physical space or region, such as a loading dock facility as exemplified herein. Example systems and methods disclosed herein provide a more efficient and accurate calibration process by enabling the multiple image sensors to be calibrated all-at-once instead of one-at-a-time. Other benefits of the example systems and methods disclosed herein include a robust, flexible, and expandable calibration scheme, which can fit for any number of image sensors in a network and that can be applied to any image sensor layout; an ability to correct image data noise and initial alignment errors; an ability to refine various initial calibration results; and a more accurate final alignment process that yields lower alignment errors than compared with conventional methods.

In some embodiments, a calibrator and a calibration refiner disclosed herein are used to calibrate multiple image sensors based on image data. The calibrator performs an initial calibration based on image data collected for an omnidirectional object present in the region of interest (i.e., an imaging area). In examples, the calibrator utilizes a spherical object as the omnidirectional object for the initial calibration. Generally, an omnidirectional object has a same or similar surface from each perspective of each of the multiple image sensors at different locations, providing a consistent or near-consistent surface as the multiple image sensors track the omnidirectional object within the region of interest. Put another way, an omnidirectional object has the same shape or profile when viewed from any direction or perspective.

As described herein, omnidirectional object calibration has benefits over conventional methods because omnidirectional object calibration enables calibration based on an omnidirectional object that is consistent from any view angle, and can be detected reliably from any image sensor view such that all image sensors may be calibrated simultaneously. As a result, compared to a system that is calibrated in a pairwise manner, an omnidirectional object calibration incurs much less error. In addition, when utilizing an omnidirectional object calibration, all image sensors may be calibrated to the same reference camera independently and simultaneously without accumulated error. In some embodiments, depending on the weight and size of the omnidirectional object, the omnidirectional object can be placed anywhere in an image sensor's common field of vision (FOV), where the omnidirectional object is able to cover most of the camera's FOV. In some embodiments, as disclosed herein, a synthetic reference object model aids a more accurate and stable iterative closest point (ICP) analysis than compared with using an ICP analysis for a non-omnidirectional object calibration.

By way of contrast, use of a conventional non-omnidirectional object for calibration purposes may include several limitations. For example, a non-omnidirectional object, such as a checkerboard planar surface, may be view angle sensitive. This can create an issue, such as an accumulated calibration error for wide baseline image sensors, where corner detection on the checkerboard is prone to fail due to extreme view angle. In addition, pairwise calibration may not be applicable for non-adjacent image sensors due to large view angle difference. This accumulated calibration error increases with the number of image sensors being calibrated. Accordingly, because of the physical limitations of a non-omnidirectional object, such as a checkerboard, such a non-omnidirectional object cannot cover a large portion of each image sensor's FOV, which can lead to inaccurate extrinsic calibration of the multiple image sensors. In addition, for a non-omnidirectional object, each pair of adjacent image sensors would need to be calibrated separately, where calibrating all image sensors can be time consuming, especially when a large number of image sensors are present.

In examples disclosed herein, the calibration refiner performs a synthetic 3D model-based calibration to refine the initial calibration output from the calibrator. For example, image data typically contains noise, or white data, that can lead to alignment errors in multiple image sensor calibration. The calibration refiner disclosed herein reduces such errors and refines the initial calibration by aligning a synthetic 3D model to a reference object of the image data, as described in detail below. Use of the synthetic 3D model to aid alignment is advantageous because, instead of relying on the original noisy image data captured from multiple views of the multiple image sensors, the calibration refiner disclosed herein aligns each of the image sensor views to synthetic noise-free 3D model object points, providing a consistent approach to ignoring and eliminating noise in image data. In addition, the calibration refiner disclosed herein has significant advantages over conventional ICP based methods, because conventional ICP methods may fail due to initial calibration error, noise data, and the amount of overlap in the views of the multiple image sensors. An additional benefit of the calibration refiner disclosed herein is enhanced scalability of image sensor networks because the calibration refiner disclosed herein provides a fast and robust convergence process over traditional ICP alignment.

FIG. 1 depicts an embodiment of an example environment including a plurality of image sensors for capturing image data in accordance with teachings of this disclosure. The example environment of FIG. 1 is a representative of a loading dock including an image processing system 100 constructed in accordance with teachings of this disclosure. The example image processing system 100 of FIG. 1 includes a north imaging station 102, a west imaging station 104, a south imaging station 106, and an east imaging station 108. The imaging stations 102-108 of FIG. 1 are mounted to a frame 110. Alternative examples include any suitable number (e.g., three (3) or five (5)) of imaging stations deployed in any suitable manner (e.g., mounted to walls). The terms "north," "west," "south," and "east" are used for ease of reference and not limitation. For example, any other directions or locations used for mounting imaging stations or image sensors are applicable to the disclosure herein.

Each of the imaging stations 102-108 of FIG. 1 includes an image sensor, including image sensors 112, 114, 116, and 118, respectively, capable of capturing image data, including, for example, color image data and depth data, in a respective coordinate system. For example, each of the image sensors 112-118 can be an RGB-D sensor (e.g., a Kinect® sensor) that is capable of generating a Red-Green-Blue (RGB) color value and a depth value for each pixel of an image in a coordinate system. In alternative examples, each of the imaging stations 102-108 includes a three-dimensional (3D) image sensor that provides depth data and a separate two-dimensional (2D) image sensor that provides color image data. In such instances, the 2D image sensor may be registered to the coordinate system of the partner 3D image sensor, or vice versa, such that the color data of each pixel of an image of the 2D image sensor is associated with the depth data of that pixel for the 3D image sensor.

Each of the image sensors 112-118 of FIG. 1 is pointed toward an imaging area 120. In addition, in some embodiments, each of the image sensors 112-118 can be tilted (e.g., at a forty-five (45) degree angle) toward a floor or region of the imaging area 120. In various embodiments, each of the image sensors 112-118 generates color image data and depth data representative of the imaging area 120. When a vehicle, such as vehicle 122 of FIG. 1, carrying an object, such as object 124 of FIG. 1, enters the imaging area 120, the image sensors 112-118 generate color image data and depth data representative of the vehicle 122 and the object 124 from the respective perspectives and vantage points of image sensors 112-118. As further disclosed herein, image data for a particular interval of time, such as a millisecond of time, can be referred to a frame of image data or an image frame. In the example of FIG. 1, the vehicle 122 is depicted as a forklift and the object 124 is depicted as a package to be imaged by the image processing system 100. For example, the vehicle 122 may be in the process of moving the object 124 from a warehouse location to a trailer or other type of container associated with the loading dock illustrated in FIG. 1. In the illustrated example, vehicles can enter or exit the imaging area 120 in a first direction 126 or a second direction 128. However, any suitable number of directions are possible depending on, for example, surrounding environmental arrangement of the loading dock. As illustrated in FIG. 1, the vehicle 122 is entering the imaging area 120 in the first direction 126, where, at the current moment depicted in FIG. 1, west imaging station 114 is at a furthest distance, and east imaging station 118 is at a closest distance, from vehicle 122 and object 124.

To efficiently and accurately image (and, thus, accurately calculate, for example, one or more dimensions of) the object 124 being carried by the vehicle 122 without interrupting movement of the vehicle 122, and without requiring removal of the object 124 from the vehicle 122, the example image processing system of FIG. 1 uses systems and methods for performing image processing in accordance with teachings of this disclosure. For example, in the illustrated example of FIG. 1, a processing platform 132 is used to perform image processing, where the processing platform 132 includes a logic circuit, for example, one or more computer servers or workstations that may include one or more processors, one or more computer memories, one or more networking interfaces, and/or one or more input/output (IO) interfaces, for performing imaging processing as disclosed herein. While the processing platform 132 is depicted onsite at the loading dock illustrated in FIG. 1, in other embodiments, the processing platform 132 is remote, such as a remote location or facility where the image sensors 112-118 are in communication with a computer network, such as the Internet, and are operable to transmit captured image data across the computer network to the remote processing platform 132 for performing imaging processing as disclosed herein. An example implementation of the processing platform 132 is further depicted in FIG. 10.

The processing platform 132 may include one or more applications or modules that may be used for the image processing systems and methods, as disclosed herein, which can include the calibrator 130 and the calibration refiner 134, as depicted in FIG. 1.

Figure 2:
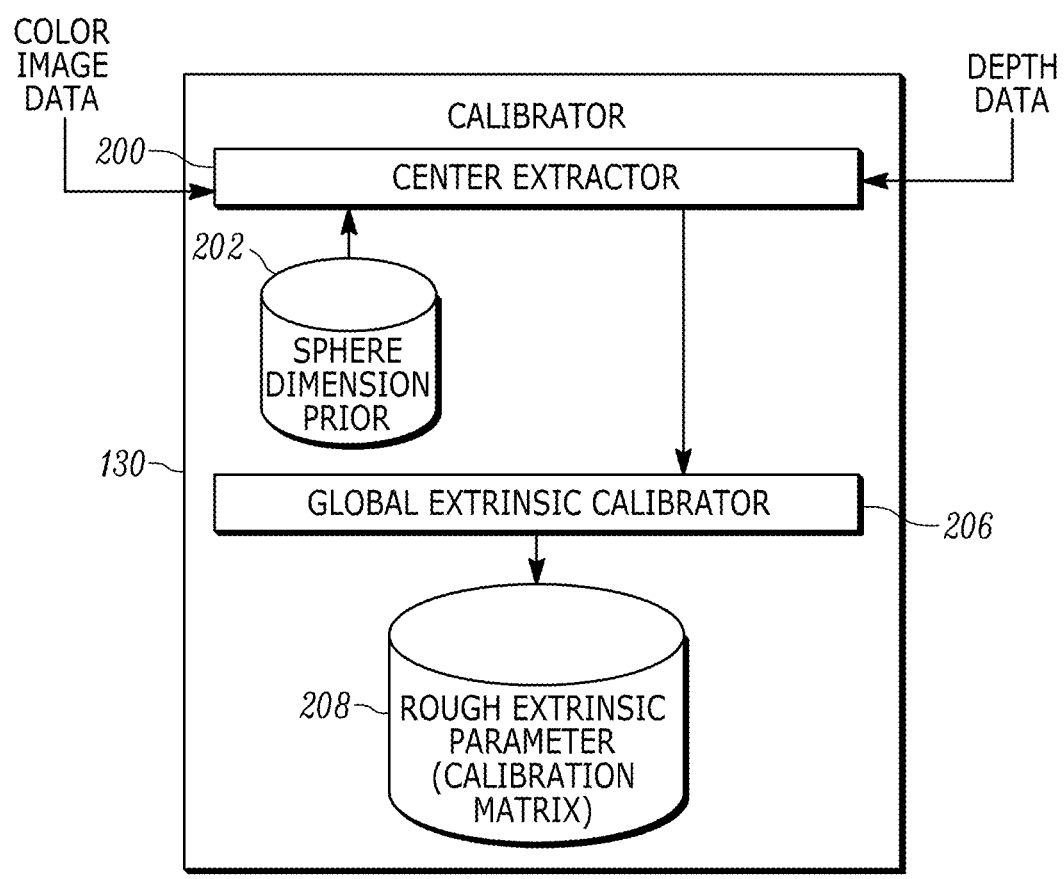
FIG. 2 illustrates a block diagram representative of an embodiment of a calibrator of FIG. 1, according to an example.

FIG. 2 illustrates a block diagram representative of an embodiment of the calibrator 130 of FIG. 1. In various embodiments, the calibrator 130 provides a robust method to extract centers of omnidirectional objects used for calibration purposes, such as a spherical object, from imaging data, such as a 3D point cloud. The 3D point cloud data can include information from a cluttered and uncontrolled environment, including, for example, the loading dock of FIG. 1. While the embodiment of FIG. 2. uses a spherical object as an example of an omnidirectional object, omnidirectional objects are not limited to spherical shapes, and other omnidirectional objects are contemplated for use with calibrator 130 as disclosed herein.

Color image data and depth data can be captured from one or more of imaging cameras or sensors, such as RGB-D wide area cameras or sensors, positioned to the given environment which, when a calibration procedure is being performed, includes the omnidirectional object. In various embodiments, each of the image sensors 112-118 captures an image frame, which includes image data at given time, that represents the omnidirectional object from the vantage point of the respective image sensor at the given point in time. In this way, as an omnidirectional object moves from one point to another within the loading dock, multiple image frames showing the omnidirectional object, including multiple frames for each image sensor at multiple locations (and with multiple views of the omnidirectional object) can be captured. Once captured, the color image data and depth data is input into a center extractor 200.

Figure 6:
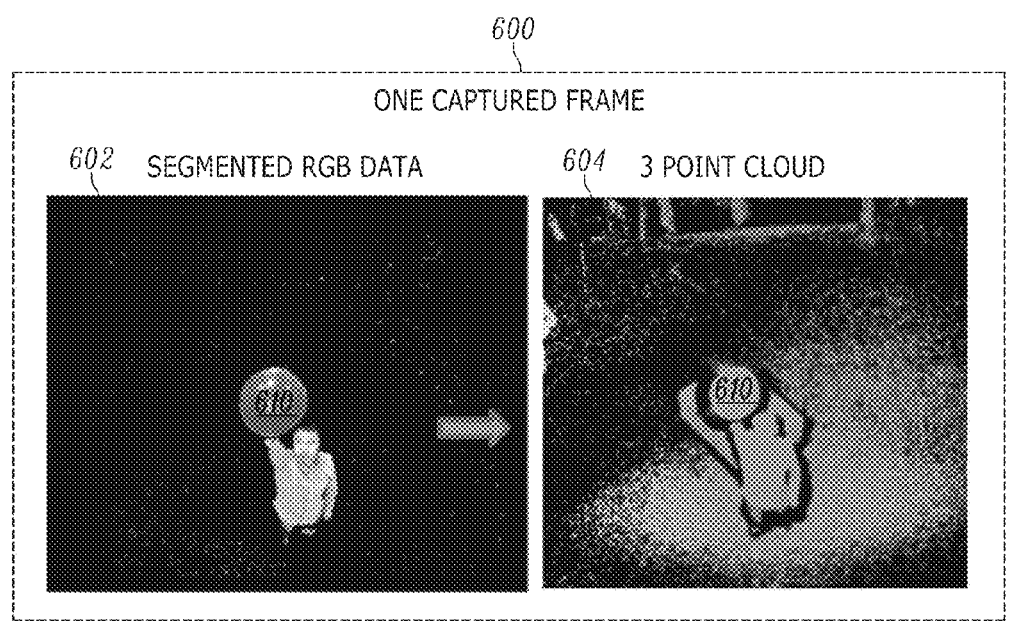
FIG. 6 depicts an example embodiment of a single image frame for image data captured from an image sensor as disclosed in various embodiments herein.

In the illustrated example, the color image data includes segmented RGB data having values for each of the red, green, and blue colors captured by the corresponding image sensor. The depth data includes 3D point cloud data that includes a set of data points that are intended to represent the external surface of an object, which, in some embodiments, represent the surface of a spherical object. An example embodiment of segmented RGB data and 3D point cloud data are depicted in FIG. 6.

In some embodiments, the color image data and/or the depth data is saved by the image sensor as a digital file. For example, in some embodiments, the depth data is saved as point cloud data in a Point Cloud Data (PCD) or Polygon File (PLY) file format. Similarly, color image data can be saved, for example, in an RGB or a Cyan-Magenta-Yellow-Key (CMYK) file format. In some embodiments, color image data and/or depth data is transmitted (e.g., over a computer network) to the calibrator 130 as input for the center extractor 200.

The example center extractor 200 executes a sphere fitting to identify the center of the omnidirectional object within each image for each frame captured over a given period of time (e.g., several seconds or minutes) that the omnidirectional object moved within the loading dock area as observed by the image sensors 112-118. In some embodiments, to determine the center of the omnidirectional object within a particular image frame, the omnidirectional object within the particular image frame is compared with a representative object sharing the same shape or size of the omnidirectional object within the particular image frame. For example, in the embodiment of FIG. 2, the representative object is a spherical object, which may be loaded from memory associated with the calibrator 130 as a sphere dimension prior object 202, and used to detect a spherical object within the particular image frames captured by the image sensors 112-118. The sphere dimension prior object 202 may have been determined prior to execution of the sphere fitting performed by the center extractor 200, and loaded into a computer memory of the calibrator 130. In this way, the calibrator 130 can use the sphere dimension prior object 202 as a template to locate the same or similar shape within the particular image frame, and, where there is match, determine the location of the omnidirectional object within the particular image frame. Notably, the center of the sphere dimension prior object 202 relative to the edges or surfaces thereof is known. Thus, once the location of the omnidirectional object is determined, the center of the omnidirectional object within the particular image frame may be determined (e.g., based on the particular shape or size of the sphere dimension prior object 202).

The identified centers of each omnidirectional object within a particular image frame may be used to determine the centers of the fields of view for the image sensors 112-118. For example, in an embodiment where the omnidirectional object is moved within the imaging area 120, then each of the image sensors 112-118 can capture an image frame for every millisecond (or other time interval) that the omnidirectional object was within each image sensor's field of view. As described herein, a set of image frames captured by the plurality of image sensors 112-118, and that share a particular point in time, may be referred to as a "frameset," where, for example, four images captured by each of the image sensors 112-118 at the time 10:12:03 am may be referred to as the "10:12:03 frameset." Although other similar naming conventions may be used, for example, where the framesets are sequentially numbered as they are captured (e.g., frameset 1, frameset 2, frameset 3, etc.).

Figure 7:
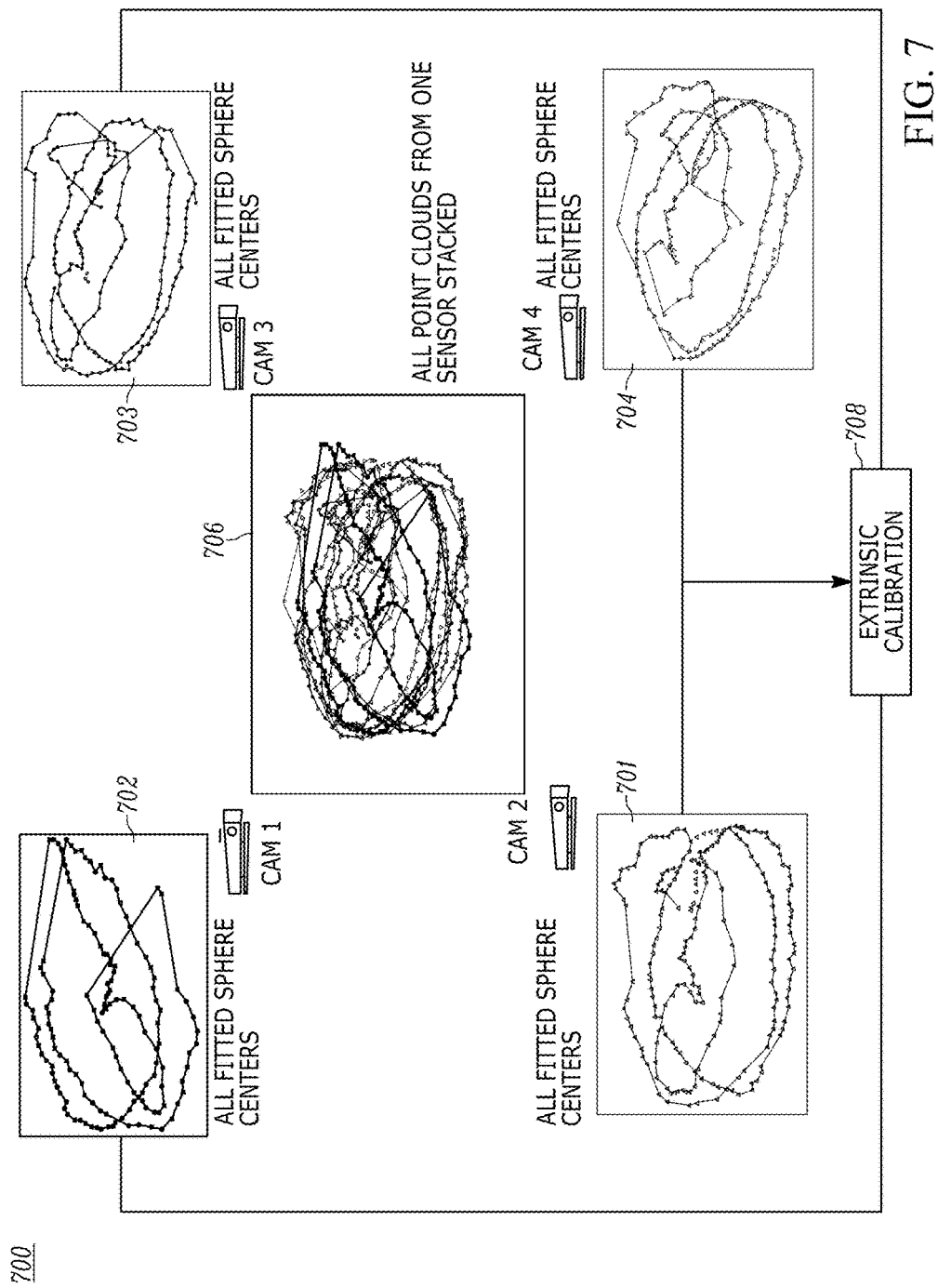
FIG. 7 depicts an example embodiment of a global extrinsic calibration process for fitting a series of image sensors using image data from each of the image sensors.

In the example of FIG. 2, a global extrinsic calibrator 206 iteratively compares each frameset to determine a common center point for each of the image sensors. The global extrinsic calibrator 206 compares the centers of each image in a frameset to extract the common center point. The comparison allows for optimization of the image sensor path by adjusting the camera field of view of the image sensor to focus on the common center point. The comparison also allows for an efficient pairwise calibration, where the images from the image sensors are compared based on distances from a reference image sensor, and where the reference image sensor can be any of the image sensors 112-118 designated as the reference image sensor. In some embodiments, the pairwise comparison is enhanced, as compared with conventional pairwise comparisons, because the number of pairwise comparisons for the disclosed embodiments is reduced where only those image sensors within a certain distance are compared. The reduction of the pairwise comparison can improve the efficiency and speed of the overall global extrinsic calibrator 206 because, by eliminating the need to compare all image sensors, the number of permutations, and thus time to perform the related processing is reduced. As described herein, FIG. 7 depicts an embodiment of a global extrinsic calibration process for fitting a series of sensors or cameras using image data from each of the image sensors.

The example global extrinsic calibrator 206 generates a rough extrinsic parameter 208 as a result of the global extrinsic calibration process described above. In some embodiments, the rough extrinsic parameter 208 is a calibration matrix, such as a rough scale or rotational translation matrix, that can be used by, for example, the image sensors 112-118 to track objects moving in the facility. Although specific examples are provided herein, the terms calibration matrix and extrinsic parameter can refer more generally to any data structure that represents data for calibrating the image sensors 112-118, as disclosed herein, and such terms are not limited to a specific data type, such as a matrix, or otherwise.

As further described herein, the calibrator 130, through use of the omnidirectional object to calibrate the image sensors 112-118, yields more accurate image tracking and processing of objects in the region of interest, with less error and image misalignment, when compared with conventional pairwise calibration, where all image sensors are aligned and enumerated one by one. During determination of the calibration matrix 208, the image misalignment or error can be determined by comparing a completed 3D scene to an image of the reference image sensor. For example, FIG. 8, described further herein, illustrates an embodiment depicting the difference of the alignment error for a set of image sensors calibrated using the omnidirectional object based calibration, compared to the alignment error for the same image sensors calibrated using a conventional pairwise based calibration.

Once calibrated, the image sensors 112-118 can be used to detect or track other objects in the same 3D region of interest, such as the object 124 carried by the vehicle 122 through the loading dock of FIG. 1. The tracked objects need not be of the same size or shape as the omnidirectional object used to determine the calibration matrix or otherwise calibrate the image sensors 112-118. For example, and as further described herein, the tracked objects can be non-omnidirectional objects, such as a box object. In addition, after calibration, the reference image sensor (i.e., one of the image sensors 112-118 designated as the reference image sensor) is no longer relevant. In other words, the reference image sensor, which can be one of the image sensors 112-118, is used for determining the calibration matrix, and once completed, the reference image sensor becomes irrelevant such that the network of image sensors 112-118 can track objects in the region of interest using the calibration matrix and without needing to identify the reference image sensor.

Figure 3:
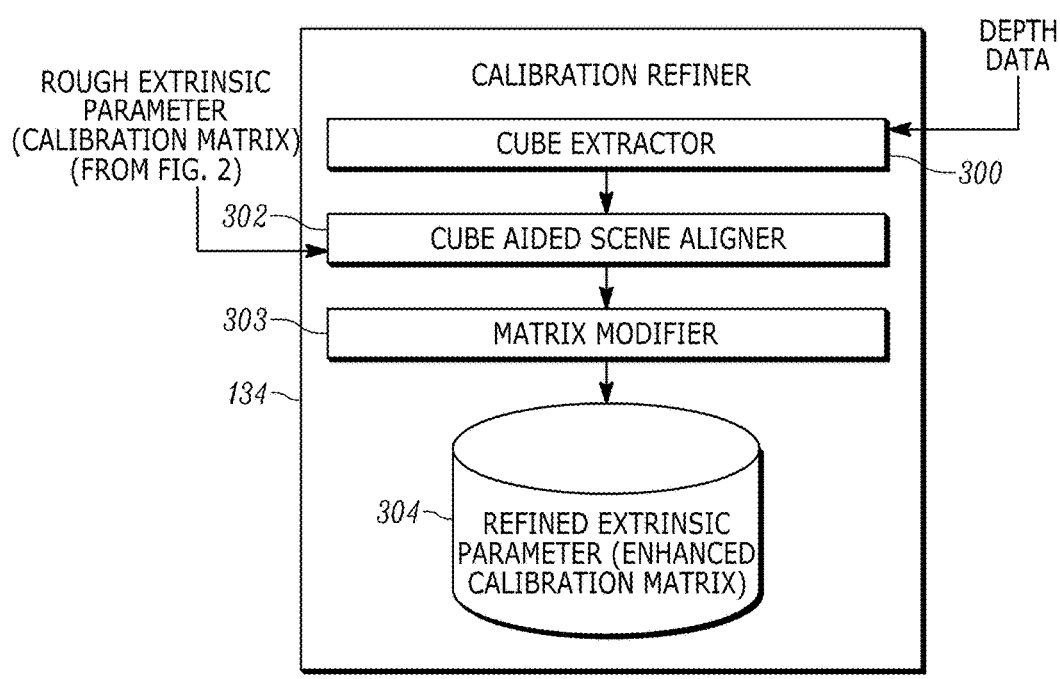
FIG. 3 illustrates a block diagram representative of an embodiment of a calibration refiner of FIG. 1, according to an example.

FIG. 3 illustrates a block diagram representative of an embodiment of the calibration refiner 134 of FIG. 1. The example calibration refiner 134 executes a global optimization method to further improve the accuracy of the omnidirectional object center estimation as described for FIG. 2. In one embodiment, the calibration refiner 134 executes a synthetic geometry assisted multi-camera extrinsic calibration method, which can compensate for, and filter, image sensor noise and view ambiguities that arise from a multiple image sensor view layout. The operations performed by the calibration refiner 134 result in a more accurate and applicable calibration when compared with a calibration that uses raw 3D data for image registration.

In the example of FIG. 3, a cube extractor 300 executes a cube extraction process, where the depth data, as captured for image frames as described for FIG. 2, are used as input. The cube extractor 300 extracts a cubed portion of the image frame from the image data, for example, from 3D point cloud data of the image, as cube reference image data for a cube reference object, where the location of the cube reference object corresponds to the location of the omnidirectional object for a given image frame. Although a cube reference object is used in the present embodiment, other shapes, for example, including other three-dimensional shapes, may be used for defining or determining the geometry or orientation of the omnidirectional object with in the given image frame as described herein.

In the example of FIG. 3, a cube aided scene aligner 302 receives the calibration matrix 208 from FIG. 2. The cube aided scene aligner 302 determines matrix transformation data, using the calibration matrix 208 from FIG. 2 and the cube reference object from the cube extractor 300, where the location of the cube reference object within an image frame corresponds with the location of the omnidirectional object from the calibration matrix 208. The location of the cube reference object within the image frame can be used to determine a merged point cloud corresponding to the reference object in the image data, where the merged point cloud can be a common point cloud for each of the image sensors 112-118.

In some embodiments, determining the merged point cloud includes comparing the merged point cloud to a synthetic model of the reference object. For example, the cube aided scene aligner 302 uses a synthetic 3D cube model that models the cube reference object with the image frame. The synthetic 3D cube model can be preloaded or stored within, for example, memory of the processing platform 132. The cube aided scene aligner 302 uses the synthetic 3D cube model to extract the reference image data for the cube reference object in image frames by positioning the synthetic 3D cube model within images or frames at the location of the omnidirectional object within the image frame and then extracting the reference image data from that location. The synthetic 3D cube model can be used to distinguish the omnidirectional object within a given image frame, and to determine the geometry and/or orientation of the omnidirectional object within the given image frame. Accordingly, the synthetic 3D cube model is used to further define and determine the geometry and/or orientation of the omnidirectional object within the given image frame, thereby improving accuracy of the calibration. In some embodiments, determining the merged point cloud includes performing an iterative closest point (ICP) process on the image data. The cube aided scene aligner 302 produces matrix transformation data that can that be used to enhance the calibration matrix 208 of FIG. 2, as further described herein.

In the example of FIG. 3, a matrix modifier 303 modifies the rough extrinsic parameter (calibration matrix) 208 into a refined extrinsic parameter (enhanced calibration matrix) 304 by applying the matrix transformation data to the calibration matrix 208, for example, by multiplying the matrix transformation data with the calibration matrix 208, or by adding the matrix transformation data to the calibration matrix.

The refined extrinsic parameter (enhanced calibration matrix) 304 may be stored. The refined extrinsic parameter (enhanced calibration matrix) 304 can be an enhanced version of the rough extrinsic parameter (calibration matrix) 208 that contains more data, and that can be more accurate, and with less misalignment error or noise, for purposes of calibrating the sensors (e.g., sensors 112-118) than compared with using the refined extrinsic parameter (enhanced calibration matrix) alone.

Accordingly, the refined extrinsic parameter (enhanced calibration matrix) 304 provides an improvement in sensor calibration for tracking an object in a three-dimensional region of interest, such as the loading dock as described herein. For example, in various embodiments, as described herein, the use of the refined extrinsic parameter (enhanced calibration matrix) to calibrate the image sensors 112-118 reduces misalignment of images captured for objects moving through a three-dimensional region of interest, such as the loading dock described herein, and thus can be used to more accurately identify and track such objects. For example, FIGS. 9A-9D illustrate the improvements and reduction in error in using the refined extrinsic parameter (enhanced calibration matrix) to calibrate the plurality of image sensors 112-118 as compared with using only the rough extrinsic parameter (calibration matrix) to calibrate the same plurality of image sensors 112-118.

Figure 4:
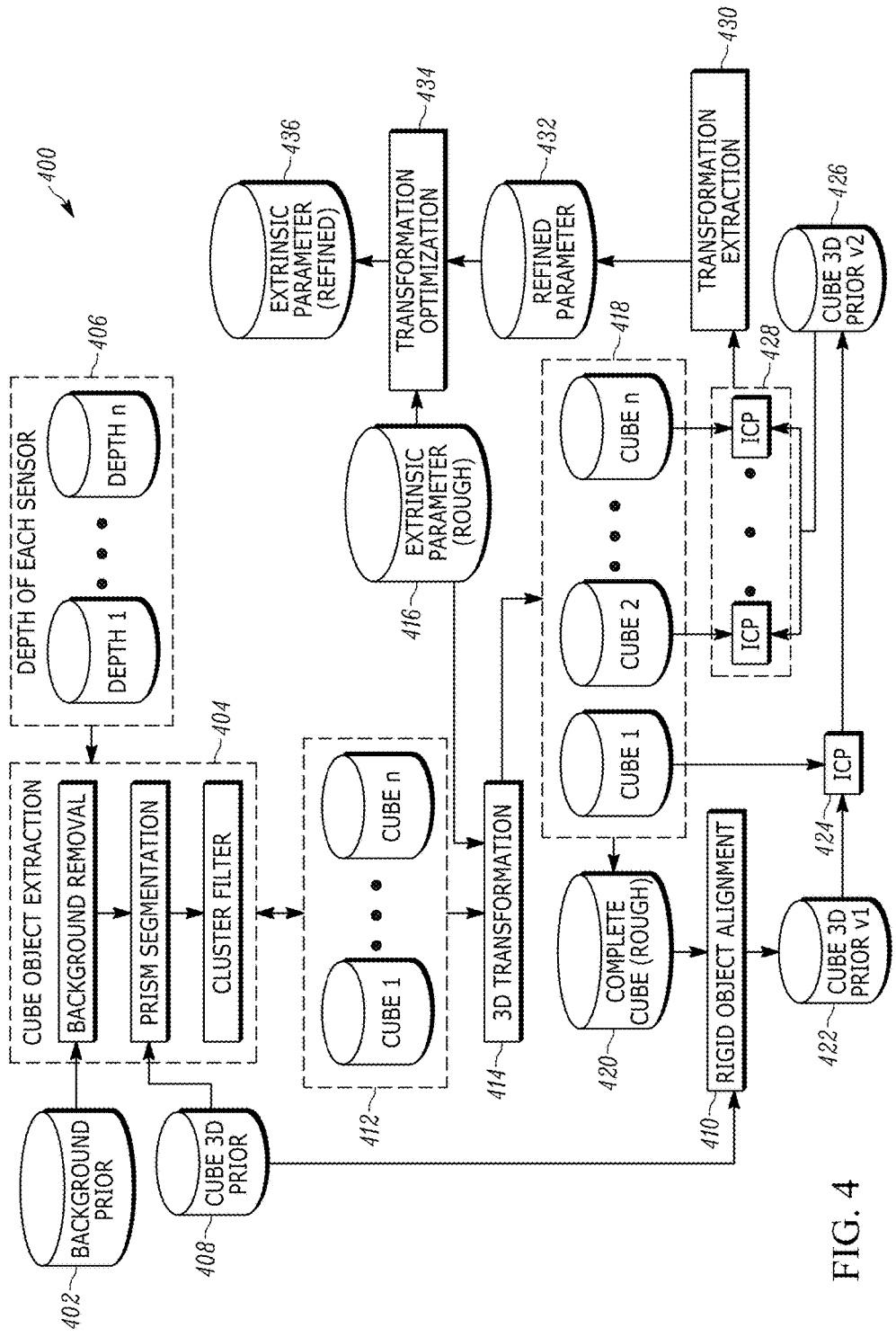
FIG. 4 illustrates a flow diagram representative of an embodiment of an implementation of the calibration refiner of FIGS. 1 and 3.

FIG. 4 illustrates a flow diagram representative of an embodiment of a detailed implementation 400 of the calibration refiner 134 of FIGS. 1 and/or 3. At block 404, depth data 406 and background data 402 from each of image sensors 112-118 are input into the cube extraction process 404. The cube extraction process 404 of FIG. 4 is executed by, for example, the cube extractor 300 of FIG. 3. At block 404, the background data 404, which is image data of the background environment for each of the image sensors captured prior to the cube extraction process 404, is used to identify and define or remove the background for image frames captured by each of the image sensors 112-118. The cube extraction process 404 includes a prism segmentation procedure that uses a synthetic 3D cube model 408, as described for FIG. 3, to identify a cube reference image data within each of the image frames. The synthetic 3D cube model 408 may be stored in memory accessible to the calibration refiner 134 prior to execution of the cube extraction process 404. In some examples, the cube extraction process 404 includes a cluster filter to further refine the cube reference image data within each of the image frames.

At block 412, the cube reference image data for each for the image frames of each of the image sensors 112-118 that are output from the cube object extraction process 404 are input into a 3D transformation process 414. The 3D transformation process 414 uses the cube reference image data, and a rough extrinsic parameter (e.g., the calibration matrix described for FIG. 2) to create the cube reference objects, as described with respect to FIG. 3, e.g., for blocks 300 and 302.

In the example of FIG. 4, the 3D transformation process 414 takes each cube reference image data for one or more of the image frames of each of the image sensors 112-118 and compares each to a complete rough cube 420. The complete rough cube 420 and the cube reference image data is aligned in a rigid object alignment process 410 where the synthetic 3D cube model 408 is used to refine the image cube reference image data using geometry and/or orientation to more accurately fit the cube reference object as described for FIG. 3, e.g., for block 302. For example, the cube reference object, as a result of the rigid object alignment process 410, may have a more accurate 3D point cloud representation of a cubed object where compared against the omnidirectional object in the image frame. The output of the rigid object alignment process 410 can store a first generation of cube reference objects at Cube 3D prior v1 422 of the calibration refiner 134.

In the illustrated example, the first generation of cube reference objects is then compared using an iterative closest point (ICP) process 424 that may be performed by a logic circuit, for example the logic circuit of processing platform 132 described herein. An ICP process can take two reference image data sources, such as point cloud reference image data from two different sensors, as an input and return a rigid transformation (e.g., rotation matrix R and translation vector T), that best aligns the point clouds for image refinement and fitting purposes. In the example of FIG. 4, the ICP process 424 takes the first generation of cube reference objects as input and returns a refined, and more rigid (e.g., with greater accuracy as to orientation and geometry, second generation of cube reference objects stored in Cube 3D prior v2 of module 426. The second generation of cube reference objects can be further used in additional ICP processes 428 to further refine and fit additional generations of cube reference objects.

At block 430, the final generation of cube reference objects is output to transformation extraction process 430, that may be performed by a logic circuit, for example the logic circuit of processing platform 132, that generates a refined parameter 432, which, in some embodiments, can be matrix transformation data as described for FIG. 3. The refined parameter 432 (e.g., matrix transformation data) can then be applied via a transformation optimization process 434 to modify extrinsic parameter 416 (e.g., calibration matrix of FIG. 2.) into an enhanced parameter refined 436, such as the enhanced calibration matrix described for FIG. 3.

Figure 5:
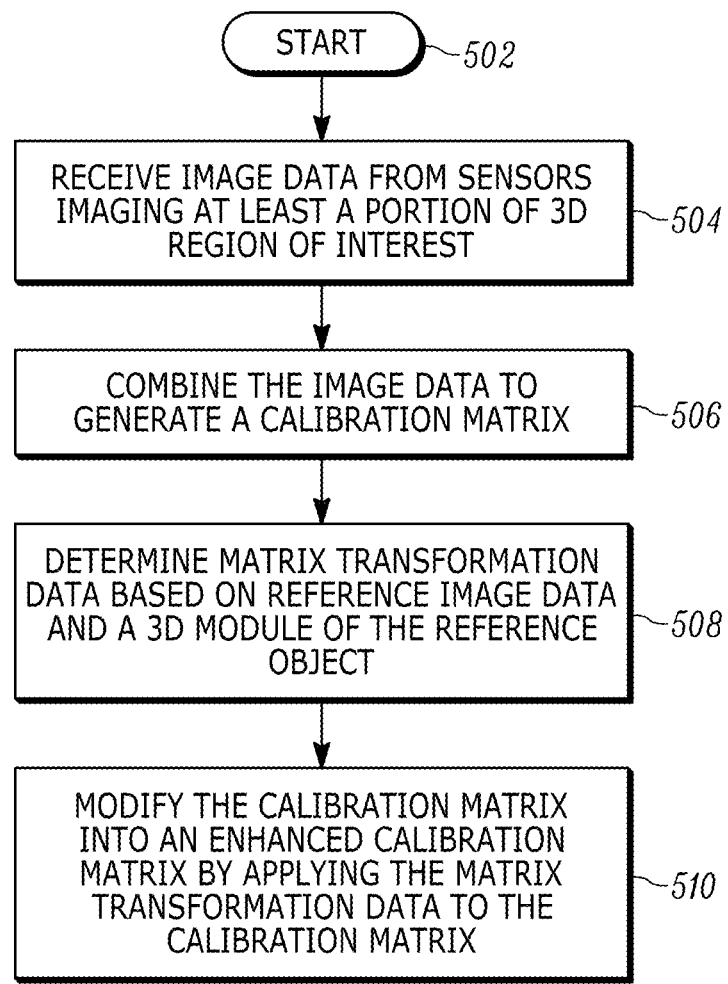
FIG. 5 illustrates an example image processing method for extrinsic calibration of a plurality of image sensors in accordance with teachings of this disclosure.

FIG. 5 illustrates an example image processing method 500 for extrinsic calibration of a plurality of sensors in accordance with teachings of this disclosure. The method 500 may be implemented by the logic circuit as described herein for FIGS. 1 and 10. Method 500 begins (502) at block 504, where a logic circuit receives image data from each of a plurality of sensors. In some embodiments disclosed herein, the sensors can be, for example, RGB-D cameras that are positioned in a wide-baseline configuration. Each of the sensors is spaced apart from the others and images at least a portion of a three-dimensional region of interest, such as a loading dock, storage facility, or other facility. In some embodiments described herein, the image data from each of the plurality of sensors includes color image data and depth data. In some embodiments, the image data can relate to, for example, an omnidirectional object, such as a spherical object, being used to calibrate the plurality of sensors. In some embodiment, the omnidirectional object may be identified in the image data using a color space filtering and point cloud analysis of the image data.

At block 506, the logic circuit combines the image data from each of the plurality of sensors to generate a calibration matrix for the plurality of sensors. The calibration matrix may be based on an omnidirectional object center extraction performed for the image data. In some embodiments, for example, omnidirectional object center extraction may include extracting, via the logic circuit, a common center for an omnidirectional object where the common center is based on a coordinate system shared by the plurality of sensors. In some examples, the common center is extracted by determining a center of the omnidirectional object in each of the image data, and iteratively adjusting the center of the omnidirectional object in each of the image data to determine a common center point.

In some embodiments, the image data includes data collected from each of the plurality of sensors as the omnidirectional object is moved over a path within the three-dimensional region of interest. In such embodiments, the process of combining the image data to generate a calibration matrix includes performing a camera path optimization on the image data.

In a further embodiment, combining the image data to generate the calibration matrix includes performing no more than N−1 pairwise calibrations for the plurality of sensors, where N equals the number of sensors and N−1 equals one less than the number of sensors.

In various embodiments, the calibration matrix is a global calibration matrix that can be generated from (i) a common center for the omnidirectional object where the common center is for a coordinate system shared by the plurality of sensors, and (ii) an omnidirectional object path optimization performed by collecting image data while moving the omnidirectional object in the three-dimensional region of interest.

At block 508, the logic circuit determines matrix transformation data based on an analysis of (i) reference image data from each of the plurality of sensors, where the reference image data includes image data for a reference object, and (ii) a three-dimensional model of the reference object. In some embodiments, the reference object is different than the omnidirectional object. In some embodiments, the matrix transformation data is determined by identifying the reference object from the image data using an image data extraction process, and determining a merged point cloud for the reference object in the image data, the merged point cloud being a common point cloud of the plurality of sensors. For example, in some embodiments, the merged point cloud is determined by comparing the merged point cloud to a synthetic model of the reference object. In some embodiments, the merged point cloud may be determined by performing an iterative closest point (ICP) process on the image data.

At block 510, the logic circuit modifies the calibration matrix into an enhanced calibration matrix by applying matrix transformation data to the calibration matrix as disclosed herein.

FIG. 6 depicts an embodiment of a single image frame for image data captured from a sensor as disclosed in various embodiments herein. In the embodiment of FIG. 6, image frame 600 includes both color image data 602 and depth data 604. In the present embodiment, image data 602 is represented as Segmented RGB data depicting Red-Blue-Green data of an omnidirectional object 610, which, in the present embodiment, is represented as a spherical object. The depth data 604 is presented as 3D point cloud data and depicts the same omnidirectional object 610, but in a 3D point cloud format.

FIG. 7 depicts an example embodiment of a global extrinsic calibration process 700 for fitting a plurality of image sensors using image data from each of the image sensors. In process 700, an omnidirectional object has been moved through a three-dimensional region of interest for each of the image sensors (Cams 1-4) to create respective image frames for each of the image sensors, that when the image frames for each respective image sensor are combined, create the combined images 701-704, respectively. For example, combined image 701 may be created form multiple image frames of a spherical object moving in a three-dimensional region of interest that Cam1 is focused on. Combined images 702-704 are created similar, but for their respective cameras (Cams 2-4) and at different viewpoints. Image 706 represents a further visualization of a combined image (e.g., 701), where all point clouds for the image frames of a given sensor are stacked together in the combined image. At block 708, the combined images 701-704 are used for extrinsic calibration of Cams1-4, which can correspond to using the rough extrinsic parameter (calibration matrix) to calibrate the image sensors 112-118 of FIG. 1, as described herein.

Figure 8:
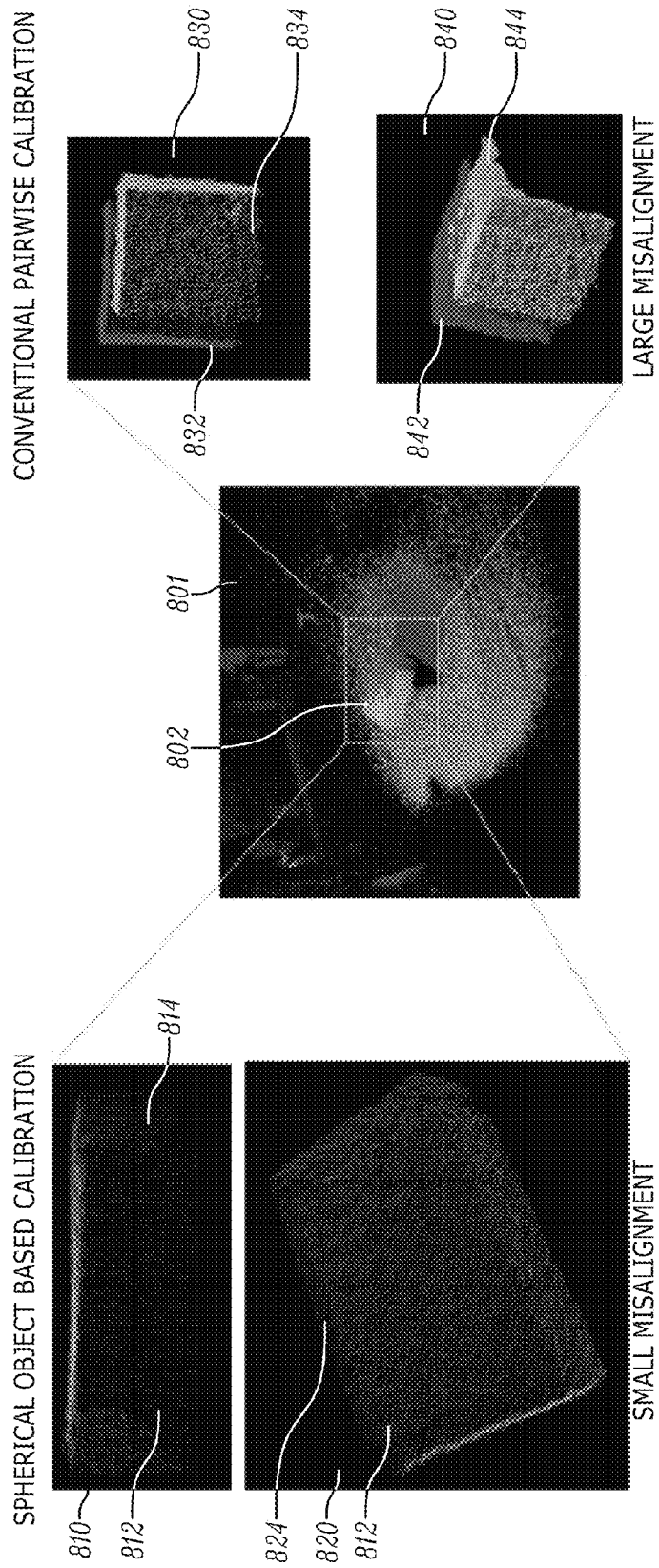
FIG. 8 illustrates an embodiment of image data visually depicting a difference between an alignment error for a set of sensors calibrated using omnidirectional object based calibration described in connection with FIG. 2, and an alignment error for the same image sensors calibrated using a conventional pairwise based calibration.
Figure 9:
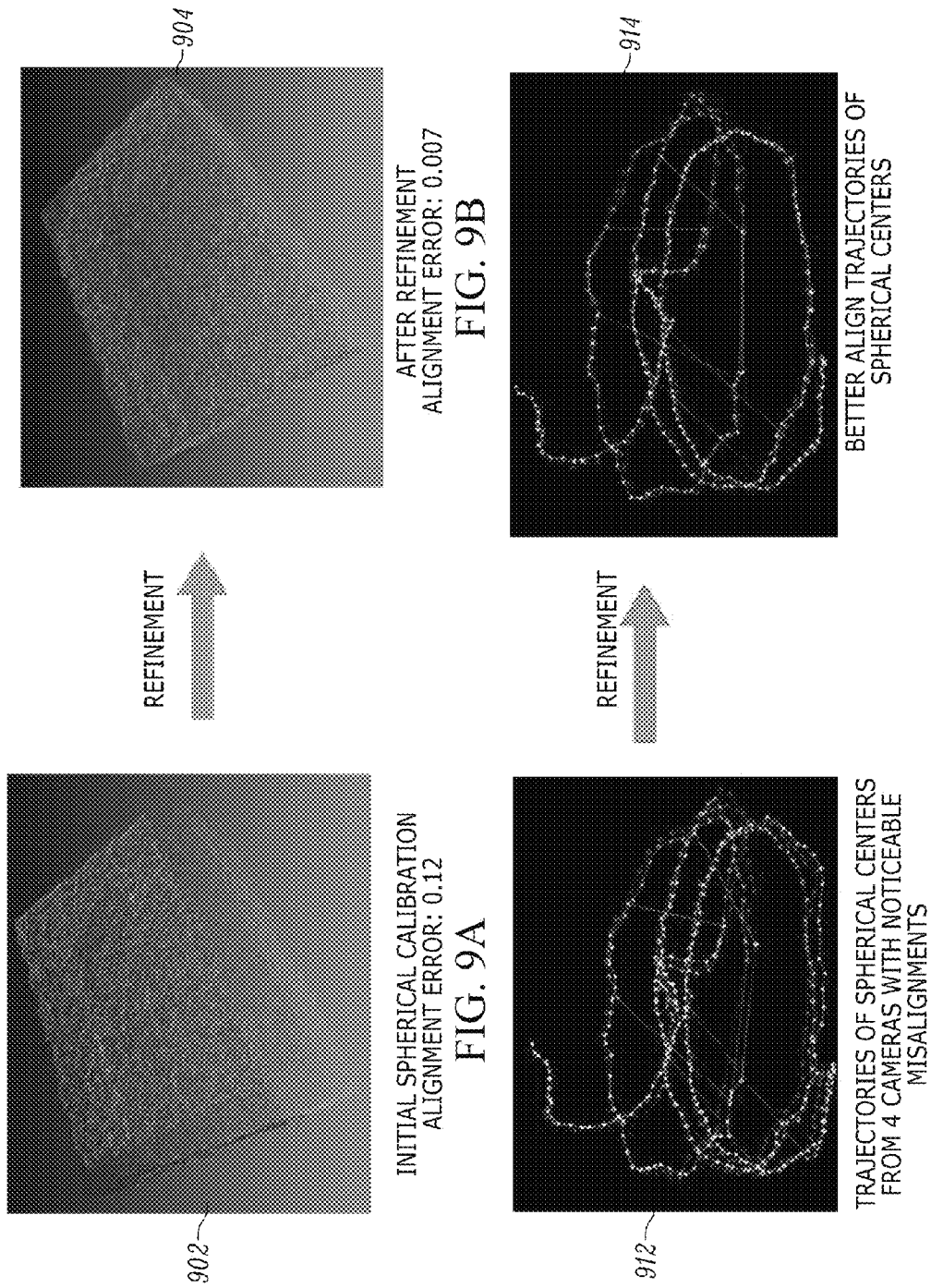
FIGS. 9A-9D illustrate embodiments of image data depicting improvements and reduction of error achieved by using a refined extrinsic parameter (e.g., an enhanced calibration matrix) to calibrate a plurality of image sensors, when compared with using a rough extrinsic parameter (e.g., a calibration matrix) to calibrate the same plurality of image sensors.

FIG. 8 illustrates an embodiment of image data visually depicting the difference between the alignment error for a set of image sensors calibrated using omnidirectional object based calibration, and the alignment error for the same sensors calibrated using a conventional pairwise based calibration. In the embodiment of FIG. 8, a plurality of image sensors capture color image data and depth data, using the systems and methods described herein, for a box object 802 as depicted in image 801. In some embodiments, the plurality of image sensors is calibrated using omnidirectional based calibration, such as a spherical object based calibration, as described herein. As visually depicted, each of combined image 810 and combined image 820 represent images captured by sensors aligned using a spherical object based calibration, which can result in a small misalignment error for the box object 802 of image 801. For example, combined image 810 includes two separate combined images 812 and 814 of box object 802, each of which can represent an image captured by a separate sensor at different viewing angles, such as sensor 112 and sensor 114, respectively as depicted in combined image 810, image 812 and 814 are tightly fit, such that the box object rendered in each image nearly or completely overlaps one another in all three dimensions of combined image 810, resulting in a small misalignment between the box objects rendered for images 812 and 814 in the 3D space of combined image 810.

Combined image 820 can represent a rotated view or different view angle of combined image 810. Similar to combined image 810, combined image 820 image depicts images 822 and 824 that are tightly fit, such that the box object rendered in each of image 822 and 824 nearly or completely overlaps one another in all three dimensions of combined image 820, resulting in a small misalignment error between the box objects rendered for images 822 and 824 in the 3D space of image 820.

By contrast, and as visually depicted, each of combined image 830 and combined image 840 represents images captured by sensors aligned using a conventional pairwise based calibration. Conventional pairwise based calibration can result in a large misalignment for combined image 830 and combined image 840 for the box object 802 of image 801. For example, combined image 830 includes two separate images 832 and 834 of box object 802, each of which can represent an image captured by a separate sensor at different viewing angles, such as sensor 112 and sensor 114, respectively as depicted in combined image 830, image 832 and 834 are loosely fit, such that the box objects rendered in each of image 832 and 834 partially overlap one another in all three dimensions of combined image 830, resulting in a large misalignment between the box objects rendered for images 832 and 834 in the 3D space of image 830.

Combined image 840 can represent a rotated view or different view angle of combined image 830. Similar to combined image 830, combined image 840 image depicts images 842 and 844 that are loosely fit, such that the box objects rendered in each image partially overlap one another in all three dimensions of combined image 840, resulting in a large misalignment between the box objects rendered for images 842 and 844 in the 3D space of image 840.

Accordingly, as depicted in FIG. 8, the spherical object based calibration yields a more accurate alignment, because it reduces alignment errors, when compared with conventional based pairwise calibration.

FIGS. 9A-9D illustrate embodiments of image data depicting improvements and reduction of error that can be achieved by using the refined extrinsic parameter (enhanced calibration matrix) to calibrate a plurality of sensors (e.g., sensors 112-118), when compared with using the rough extrinsic parameter (calibration matrix) to calibrate the same plurality of sensors as described herein. For example, image 902 of FIG. 9A may represent an image that includes a box object, such as box object 802 of image 801 for FIG. 8, and captured from cameras using an initial spherical calibration. As described for FIG. 8, use of spherical object based calibration can yield a small alignment error, for example, as shown in FIG. 9A to a magnitude of 0.12. However, the spherical object based calibration for the image 902 uses the rough extrinsic parameter (calibration matrix) as described for FIG. 2. By modifying the rough extrinsic parameter (calibration matrix) into a refined extrinsic parameter (enhanced calibration matrix) by applying the matrix transformation data, as descried for FIG. 3, the cameras can be recalibrated to captured an enhanced image that has less alignment error. For example, image 904 of FIG. 9B may represent image of a box object, such as box object 802 of image 801 for FIG. 8, but captured from cameras calibrated using the refined extrinsic parameter (enhanced calibration matrix). As shown, image 904 of image FIG. 9B has a reduced alignment error to a magnitude of 0.007, which is significantly less than the alignment error of 0.12 of image 902 of FIG. 9A. Accordingly, use of the refined extrinsic parameter (enhanced calibration matrix) results in a tighter fitting or overlapping of the images captured from each of the cameras calibrated using the refined extrinsic parameter (enhanced calibration matrix).

Image 912 of FIG. 9C and image 914 of FIG. 9D depict another embodiment visualizing reduction of alignment error by using the refined extrinsic parameter (enhanced calibration matrix). For example, image 912 of FIG. 9C may represent a combined image 701-407 of FIG. 7 and captured from cameras using an initial spherical calibration. Use of the spherical object based calibration can yield a small alignment error, for example, as shown in FIG. 9C, where the trajectories of the spherical centers from the cameras (Cams 1-4) of FIG. 7 yield small, but noticeable misalignments. As for image 902 of FIG. 9A, the spherical object based calibration for the image 912 of FIG. 9C uses the rough extrinsic parameter (calibration matrix) as described for FIG. 2. By modifying the rough extrinsic parameter (calibration matrix) into a refined extrinsic parameter (enhanced calibration matrix) by applying the matrix transformation data, as descried for FIG. 3, the cameras can be recalibrated to captured an enhanced image that has less alignment error. For example, image 914 of FIG. 9D may represent image of a combined image, such as a combined image 701-704 for FIG. 7, but captured from cameras calibrated using the refined extrinsic parameter (enhanced calibration matrix). As shown, image 914 of image FIG. 9D has a reduced alignment error having better aligned trajectories of the spherical centers, which is visually disguisable from the trajectories of image 912 of FIG. 9C. Accordingly, use of the refined extrinsic parameter (enhanced calibration matrix) results in a tighter fitting or overlapping of the images captured from each of the cameras calibrated using the refined extrinsic parameter (enhanced calibration matrix).

Figure 10:
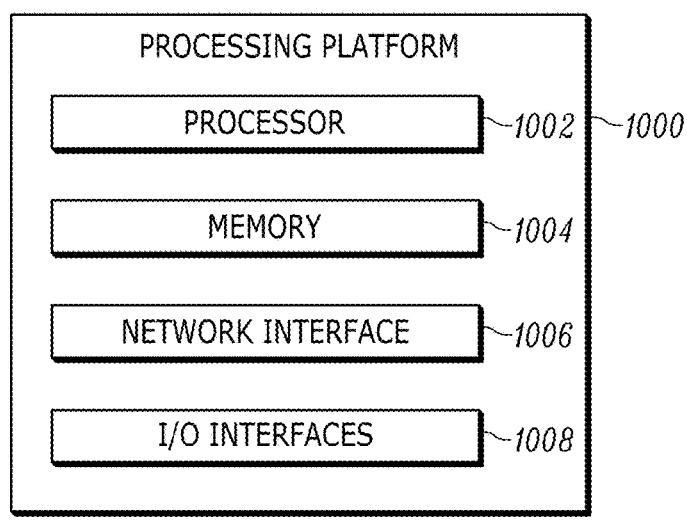
FIG. 10 is a block diagram representative of an example logic circuit, in accordance with examples herein.

FIG. 10 is a block diagram representative of an example logic circuit that may be utilized to implement, for example, the calibrator 130 of FIG. 2 or the calibration refiner 134 as described for FIGS. 3 and 4 and/or any elements thereof. The logic circuit of FIG. 9 may be included as at least a part of the processing platform 132 as described for FIG. 1. Additionally or alternatively, the example logic circuit represented in FIG. 10 may be utilized to implement the image processing method 500 of FIG. 5, to receive, store or capture the image frame 600 as depicted for FIG. 6, or execute the global extrinsic calibration process 700 of FIG. 7.

The example logic circuit of FIG. 10 is a processing platform 1000 capable of executing instructions to, for example, implement the example operations represented by the block diagrams or flowcharts of the drawings accompanying this description. As described below, alternative example logic circuits include hardware (e.g., a gate array) specifically configured for performing operations represented by the block diagrams or flowcharts of the drawings accompanying this description.

The example processing platform 1000 of FIG. 10 includes a processor 1002 such as, for example, one or more microprocessors, controllers, and/or any suitable type of processor. The example processing platform 1000 of FIG. 10 includes memory (e.g., volatile memory, non-volatile memory) 1004 accessible by the processor 1002 (e.g., via a memory controller). The example processor 1002 interacts with the memory 1004 to obtain, for example, machine-readable instructions stored in the memory 1004 corresponding to, for example, the operations represented by the flowcharts of this disclosure. Additionally or alternatively, machine-readable instructions corresponding to the example operations of the block diagrams or flowcharts may be stored on one or more removable media (e.g., a compact disc, a digital versatile disc, removable flash memory, etc.) that may be coupled to the processing platform 1000 to provide access to the machine-readable instructions stored thereon.

The example processing platform 1000 of FIG. 10 includes a network interface 1006 to enable communication with other machines via, for example, one or more computer networks, such as the Internet. The example network interface 1006 includes any suitable type of communication interface(s) (e.g., wired and/or wireless interfaces) configured to operate in accordance with any suitable protocol(s).

The example processing platform 1000 of FIG. 10 includes input/output (I/O) interfaces 1008 to enable receipt of user input and communication of output data to the user.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

We claim:

1. An image processing method for extrinsic calibration of a plurality of image sensors using a logic circuit, the image processing method comprising:
   receiving, at the logic circuit, image data from each of the plurality of image sensors, each of the image sensors being spaced apart and configured to image at least a portion of a region of interest, wherein the image data from each of the plurality of image sensors comprises color image data and depth data representative of an omnidirectional object;
   combining, using the logic circuit, the image data from each of the plurality of image sensors to generate a calibration matrix for the plurality of image sensors, the calibration matrix being based on an omnidirectional object center extraction performed for the image data;
   determining, using the logic circuit, matrix transformation data based on an analysis of (i) reference image data from each of the plurality of image sensors, the reference image data comprising image data representative of a reference object, and (ii) a three-dimensional model of the reference object, wherein the reference object is different than the omnidirectional object; and
   modifying, using the logic circuit, the calibration matrix into an enhanced calibration matrix by applying the matrix transformation data to the calibration matrix.

2. The image processing method of claim 1, wherein the omnidirectional object center extraction comprises:
   extracting, using the logic circuit, a common center for the omnidirectional object, the common center being for a coordinate system shared by the plurality of image sensors.

3. The image processing method of claim 2, wherein extracting the common center comprises:
   determining a center of the omnidirectional object in each of the image data; and
   iteratively adjusting the center of the omnidirectional object in each of the image data to determine a common center point.

4. The image processing method of claim 2, wherein the image data includes data collected from each of the plurality of image sensors as the omnidirectional object is moved over a path within the region of interest, and wherein combining the image data to generate the calibration matrix comprises performing a camera path optimization on the image data.

5. The image processing method of claim 1, wherein combining the image data to generate the calibration matrix comprises performing no more than N−1 pairwise calibrations for the plurality of image sensors, where N equals the number of image sensors.

6. The image processing method of claim 1, wherein the calibration matrix is a global calibration matrix generated from (i) a common center for the omnidirectional object, the common center being for a coordinate system shared by the plurality of image sensors, and (ii) an omnidirectional object path optimization performed by collecting image data while moving the omnidirectional object in the region of interest.

7. The image processing method of claim 1, the image processing method further comprising identifying the omnidirectional object in the image data using a color space filtering and point cloud analysis of the image data.

8. The image processing method of claim 1, wherein the omnidirectional object is a spherical object.

9. The image processing method of claim 1, wherein the image sensors are each an RGB-D camera positioned in a wide-baseline configuration.

10. The image processing method of claim 1, wherein determining the matrix transformation data comprises:
   identifying the reference object from the image data using an image data extraction process; and
   determining a merged point cloud for the reference object in the image data, the merged point cloud being a common point cloud of the plurality of image sensors.

11. The image processing method of claim 10, wherein determining the merged point cloud comprises performing an iterative closest point process on the image data.

12. The image processing method of claim 10, wherein determining the merged point cloud comprises comparing the merged point cloud to a synthetic model of the reference object.

13. An image processing system configured for the extrinsic calibration of a plurality of sensors, the image processing system comprising a logic circuit configured to:
   receive, using the logic circuit, image data from each of the plurality of sensors, each of the sensors being spaced apart and imaging at least a portion of a three-dimensional region of interest, wherein the image data from each of the plurality of sensors comprises color image data and depth data for an omnidirectional object;
   combine, using the logic circuit, the image data from each of the plurality of sensors to generate a calibration matrix for the plurality of sensors, the calibration matrix being based on an omnidirectional object center extraction performed for the image data;
   determine, using the logic circuit, matrix transformation data based on an analysis of (i) reference image data from each of the plurality of sensors, the reference image data comprising image data for a reference object, and (ii) a three-dimensional model of the reference object, wherein the reference object is different than the omnidirectional object; and
   modify, using the logic circuit, the calibration matrix into an enhanced calibration matrix by applying the matrix transformation data to the calibration matrix.

14. The image processing system of claim 13, wherein the omnidirectional object center extraction comprises using the logic circuit to extract a common center for the omnidirectional object, the common center being for a coordinate system shared by the plurality of sensors.

15. The method of claim 14, wherein extracting the common center comprises using the logic circuit to:
   determine a center of the omnidirectional object in each of the image data; and
   iteratively adjust the center of the omnidirectional object in each of the image data to determine a common center point.

16. The image processing system of claim 14, wherein the image data includes data collected from each of the plurality of sensors as the omnidirectional object is moved over a path within the three-dimensional region of interest, and wherein combining the image data to generate the calibration matrix comprises performing a camera path optimization on the image data.

17. The image processing system of claim 13, wherein combining the image data to generate the calibration matrix comprises performing no more than N−1 pairwise calibrations for the plurality of sensors, where N equals the number of sensors.

18. The image processing system of claim 13, wherein the calibration matrix is a global calibration matrix generated from (i) a common center for the omnidirectional object, the common center being for a coordinate system shared by the plurality of sensors, and (ii) an omnidirectional object path optimization performed by collecting image data while moving the omnidirectional object in the three-dimensional region of interest.

19. The image processing system of claim 13 further configured to identify the omnidirectional object in the image data using a color space filtering and point cloud analysis of the image data.

20. The image processing system of claim 13, wherein the omnidirectional object is a spherical object.

21. The image processing system of claim 13, wherein the sensors are each an RGB-D camera positioned in a wide-baseline configuration.

22. The image processing system of claim 13, wherein determining the matrix transformation data comprises using the logic circuit to:
   identify the reference object from the image data using an image data extraction process; and
   determine a merged point cloud for the reference object in the image data, the merged point cloud being a common point cloud of the plurality of sensors.

23. The image processing system of claim 22, wherein determining the merged point cloud comprises using the logic circuit to perform an iterative closest point process on the image data.

24. The image processing system of claim 22, wherein determining the merged point cloud comprises using the logic circuit to compare the merged point cloud to a synthetic model of the reference object.

* * * * *